(12) United States Patent
Kanazawa et al.

(10) Patent No.: US 10,409,842 B2
(45) Date of Patent: Sep. 10, 2019

(54) STORAGE MEDIUM, MAP INFORMATION PROCESSING APPARATUS, AND DATA GENERATION METHOD

(71) Applicant: Mitsubishi Electric Corporation, Tokyo (JP)

(72) Inventors: Seigo Kanazawa, Tokyo (JP); Tomoya Ikeuchi, Tokyo (JP); Hisanobu Masuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 523 days.

(21) Appl. No.: 14/916,810

(22) PCT Filed: Sep. 17, 2013

(86) PCT No.: PCT/JP2013/075021
§ 371 (c)(1),
(2) Date: Mar. 4, 2016

(87) PCT Pub. No.: WO2015/040670
PCT Pub. Date: Mar. 26, 2015

(65) Prior Publication Data
US 2016/0196282 A1    Jul. 7, 2016

(51) Int. Cl.
*G06F 16/00*    (2019.01)
*G06F 16/29*    (2019.01)
(Continued)

(52) U.S. Cl.
CPC ............ *G06F 16/29* (2019.01); *G06F 16/248* (2019.01); *G09B 29/00* (2013.01); *G09B 29/006* (2013.01); *G09B 29/10* (2013.01); *G09B 29/106* (2013.01)

(58) Field of Classification Search
CPC combination set(s) only.
See application file for complete search history.

(56) References Cited

U.S. PATENT DOCUMENTS 8,098,899 B2    1/2012 Ohashi
2003/0036845 A1*    2/2003 Nakane .................. G01C 21/32
701/451
(Continued)

FOREIGN PATENT DOCUMENTS

CN    102597700 A    7/2012
CN    103164512 A    6/2013
(Continued)

OTHER PUBLICATIONS

Samet, "Spatial Data Structures," Modern Database Systems: The Object Model, Interoperability, and Beyond, Addison Wesley/ACM Press, 1995, pp. 361-385.
(Continued)

*Primary Examiner* — Alexander Khong
(74) *Attorney, Agent, or Firm* — Birch, Stewart, Kolasch & Birch, LLP

(57) ABSTRACT

It is an object of the present invention to provide a technique by which a desired search can be performed even without any polygon data. An administrative district area is defined by collecting mesh areas in each of which a POI is located, for each administrative district, among mesh areas obtained by sectioning an area on a map, and an extended administrative district area is defined by extending the administrative district area. Then, the data storage stores therein data in which a name of an administrative district is associated with a POI within the extended administrative district area related to the administrative district, as search data.

10 Claims, 12 Drawing Sheets

(51) Int. Cl.
    *G06F 16/248*    (2019.01)
    *G09B 29/00*     (2006.01)
    *G09B 29/10*     (2006.01)

(56) References Cited

U.S. PATENT DOCUMENTS

| | | | |
|---|---|---|---|
| 2006/0167934 A1* | 7/2006 | Nomura | G01C 21/32 |
| 2011/0208617 A1 | 8/2011 | Weiland | |
| 2012/0130944 A1 | 5/2012 | Masuda et al. | |

FOREIGN PATENT DOCUMENTS

| | | | | |
|---|---|---|---|---|
| JP | 2007-133825 A | | 5/2007 | |
| JP | 2008-089815 A | * | 4/2008 | G06F 17/30 |
| JP | 2009-259077 A | * | 11/2009 | G06F 17/30 |
| JP | 2011-75324 A | | 4/2011 | |
| JP | 2013-73290 A | | 4/2013 | |
| JP | 2013-83507 A | | 5/2013 | |

OTHER PUBLICATIONS

Office Action dated Nov. 23, 2018 in corresponding Chinese Application No. 201380079635.9.

* cited by examiner

F I G. 7

| NAME | EXTENDED ADMINISTRATIVE DISTRICT NAME | REAL AREA NAME |
|---|---|---|
| cd | A CITY | A CITY |
| ef | A CITY | A CITY |
| ef | B CITY | A CITY |
| gh | A CITY | B CITY |
| gh | B CITY | B CITY |
| ij | B CITY | B CITY |

~15b

F I G. 8

```
ADDRESS    A CITY
• cd
• ef
• gh(B CITY)
```

F I G. 9

```
ADDRESS    B CITY
• ef(A CITY)
• gh
• ij
```

FIG. 10

```
ADDRESS      A CITY
 • cd
 • ef
```

FIG. 11

```
ADDRESS      B CITY
 • gh
 • ij
```

STORAGE MEDIUM, MAP INFORMATION PROCESSING APPARATUS, AND DATA GENERATION METHOD

TECHNICAL FIELD

The present invention relates to a storage medium which stores therein search data to be used to search for a feature on a map, a map information processing apparatus which comprises the storage medium, and a data generation method by which the search data is generated.

BACKGROUND ART

As to navigation apparatuses or the like, known is a technique for making a search for POIs (Points Of Interest) such as facilities, streets, and the like on the basis of an address received from a user, and various propositions are made for the technique. For Patent Document 1, for example, proposed is a technique for making a search for a POI from an administrative district on the assumption that adjacent areas of administrative districts (cities, towns, villages, and the like) are extended and POIs included in an overlapping part of the two extended areas belong to both the two administrative districts.

PRIOR-ART DOCUMENTS

Patent Documents

[Patent Document 1] Japanese Patent Application Laid Open Gazette No. 2009-259077

SUMMARY OF INVENTION

Problems to be Solved by the Invention

In the technique shown in Patent Document 1, the areas of administrative districts to be extended are represented by polygon data, and therefore the polygon data is needed in order to perform the above search. The polygon data, however, has a problem of being complicated, requiring large storage capacity, or the like, and therefore, there are devices having no polygon data in the actual market. For this reason, there arises a problem that the devices having no polygon data cannot perform such a search as above.

Then, the present invention is intended to solve the above problem, and it is an object of the present invention to provide a technique by which a desired search can be performed even without any polygon data.

Means for Solving the Problems

The present invention is intended for a storage medium including a memory which stores therein search data that a map information processing apparatus uses to search for a feature on a map. According to an aspect of the present invention, in the storage medium, an administrative district area is defined by mesh areas corresponding to an administrative district, among mesh areas obtained by sectioning an area on the map, an extended administrative district area is defined by the administrative district area and a predetermined number of the mesh areas which surround the periphery of the administrative district area, and the search data is data in which the extended administrative district area is associated with the feature within the extended administrative district area and an administrative district in which the feature is located.

Effects of the Invention

In the storage medium according to the present invention, stored is the search data in which the name of the administrative district is associated with the specific feature within the extended administrative district area related to the administrative district. It is thereby possible to perform a desired search by having the search data, even without any polygon data.

These and other objects, features, aspects and advantages of the present invention will become more apparent from the following detailed description of the present invention when taken in conjunction with the accompanying drawings.

BRIEF DESCRIPTION OF DRAWINGS

FIG. 7 is another view used for explaining the search data in accordance with the first preferred embodiment;

FIGS. 8 to 11 are views each showing an exemplary display on the navigation device in accordance with the first preferred embodiment;

DESCRIPTION OF EMBODIMENTS

The First Preferred Embodiment

Figure 1:
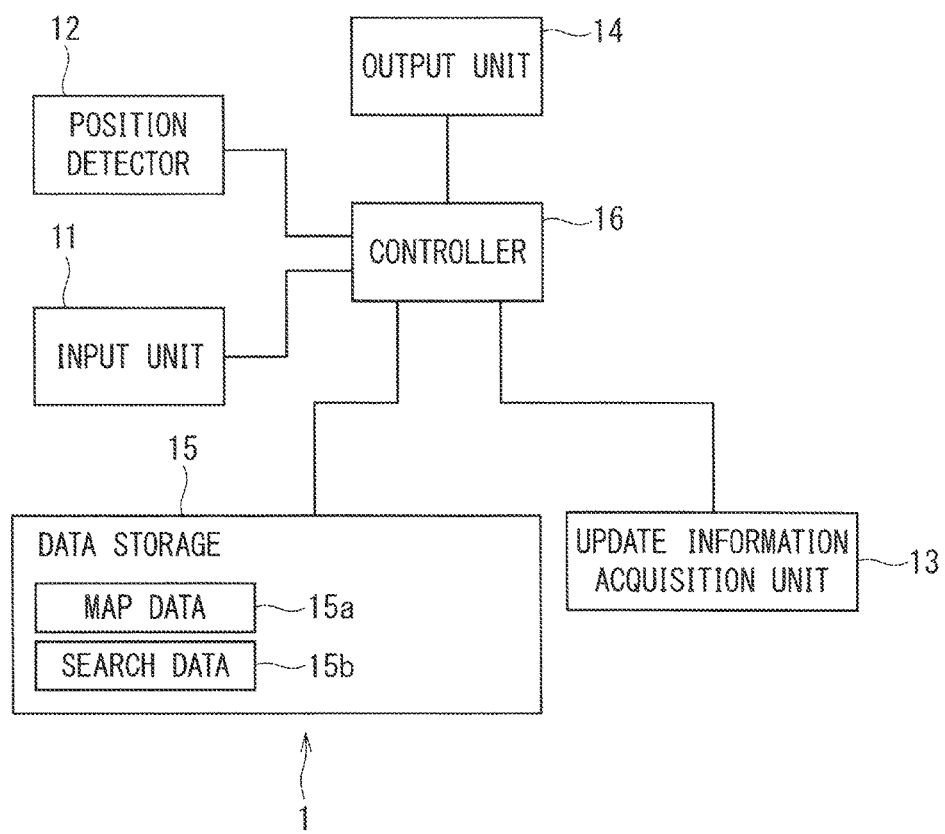
FIG. 1 is a block diagram showing an exemplary constitution of a navigation device in accordance with a first preferred embodiment.

Description will be made on a case where a map information processing apparatus of the present invention is applied to a navigation device mountable on a vehicle. FIG. 1 is a block diagram showing an exemplary constitution of the navigation device. In the following description, a vehicle on which the navigation device 1 shown in FIG. 1 is mounted is referred to as a "self-vehicle".

The navigation device 1 comprises an input unit 11, a position detector 12, an update information acquisition unit 13, an output unit 14, a data storage 15, and a controller 16. The controller 16 is constituted of, for example, a CPU (Central Processing Unit), a processor, and the like, and these constituent elements execute a program stored in the data storage 15. The controller 16 can thereby generally control the constituent elements of the navigation device 1 and perform various information processings.

The input unit 11 receives various information such as a manipulation or an instruction from a user such as a driver, and outputs instruction information in accordance with the received information to the controller 16. To the input unit 11, for example, a voice recognition device capable of recognizing a voice of the user and outputting the instruction information on the basis of the voice, a button capable of outputting the instruction information in accordance with the manipulation of the user, or other appropriate input devices can be applied.

The position detector 12 detects a current position of the self-vehicle and outputs position information indicating the current position to the controller 16. To the position detector 12, for example, a GPS (Global Positioning System) receiver which detects a current position (e.g., the latitude and longitude) of the self-vehicle on the basis of a GPS signal received from a GPS satellite, a speed sensor which detects a speed of the self-vehicle, an angular velocity sensor which detects an angular velocity of the self-vehicle, or the like can be applied.

The update information acquisition unit 13 acquires update information to be used for updating data stored in the data storage 15, from the outside, and outputs the update information to the controller 16. To the update information acquisition unit 13, for example, a memory card reader which reads out the update information from a memory card which stores therein the update information, a communication device which receives the update information through communication from a server which manages map information or the like as the update information, or the like can be applied.

The output unit 14 presents various information to the user in accordance with the control of the controller 16. Though description will be made herein on a case where a display which displays thereon various information is applied to the output unit 14, the present invention is not limited to this case. To the output unit 14, a voice output device which outputs various information by voice may be applied, or both the display and the voice output device may be applied.

The data storage 15 is a storage medium in which map data 15a and search data 15b are stored (memorized) in advance, and to the data storage 15, for example, a hard disk and a hard disk drive, a DVD (Digital Versatile Disc) and a drive device therefor, a BD (Blu-ray Disc) and a drive device therefor, a semiconductor memory, or the like can be applied.

The map data 15a includes, for example, map information and information used to manage the map information. In the following description, a "map" refers to a map indicated by the map information of the map data 15a.

The search data 15b is data that the navigation device 1 uses to search for a feature on a map. As described later in detail, in the search data 15b, a name of an administrative district such as a city, a town, a village, an urban area (city area), or the like is associate with a specific feature within the administrative district and a specific feature within an extended administrative district area. Though description will be made in the first preferred embodiment on a case where the specific feature in the search data 15b is a POI, the present invention is not limited to this case.

The controller 16 generally controls the constituent elements of the navigation device 1, to thereby make it possible to perform various information processings, as described above.

As an exemplary information processing, the controller 16 performs various map information processings on the basis of the instruction information from the input unit 11, the position information from the position detector 12, and the information read out from the data storage 15. The various map information processings include, for example, a map matching for estimating the current position of the self-vehicle on the basis of the position information from the position detector 12 and the map information (map data 15a) from the data storage 15, a route search for searching for a route from a point of departure to a destination which is received by the input unit 11, a route display for displaying candidates for preferred route which are obtained by the route search, together with the map, on the output unit 14, a route guidance for guiding the user from the point of departure to the destination along the preferred route which is selected by the user, a surrounding-area display for displaying a map of an area surrounding the current position, a search process for searching for a POI or the like which is applied to the destination or the like on the basis of a facility, an address, a telephone number, and the like which are received by the input unit 11 and the search data 15b, and the like.

Further, as another exemplary information processing, the controller 16 updates the map information stored in the data storage 15 and information used to manage the map information on the basis of the update information from the update information acquisition unit 13.

<Map Information>

Next, the map information of the map data 15a will be described in detail. To a generation range (display range) of the map information, for example, a rectangular area surrounded by latitude lines and longitude lines can be applied. The map information is hierarchized in accordance with the degree of detail of the information, and the generation range of the map information is sectioned into rectangular mesh areas each of which is surrounded by the latitude lines and the longitude lines and thus managed.

Figure 2:
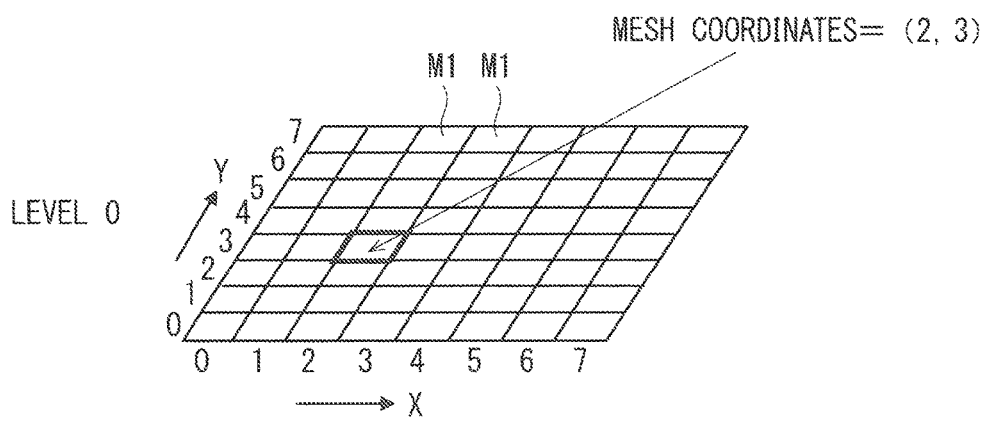
FIG. 2 is a view showing an example of a mesh area in accordance with the first preferred embodiment.

FIG. 2 is a view showing an example of the mesh area M1 of the map information. In the exemplary case of FIG. 2, the map information is sectioned into 8×8 mesh areas M1. In hierarchical levels other than the level in which the mesh areas M1 of FIG. 2 are present, for example, the map information is sectioned into 4×4 mesh areas, into 2×2 mesh areas, or the like.

In order to distinguish each mesh area M1 from the other mesh areas M1, mesh coordinates (X, Y) are given to each mesh area M1. As the mesh coordinate X, for example, 0, 1, 2, . . . are sequentially given to the mesh areas M1 from the left-end one toward the right-end one. Similarly, as the mesh coordinate Y, for example, 0, 1, 2, . . . are sequentially given to the mesh areas M1 from the lower-end one toward the upper-end one. The information on the mesh areas M1 into which the map information is sectioned is referred to as "mesh information".

<Overview of Generation of Search Data>

Figure 3:
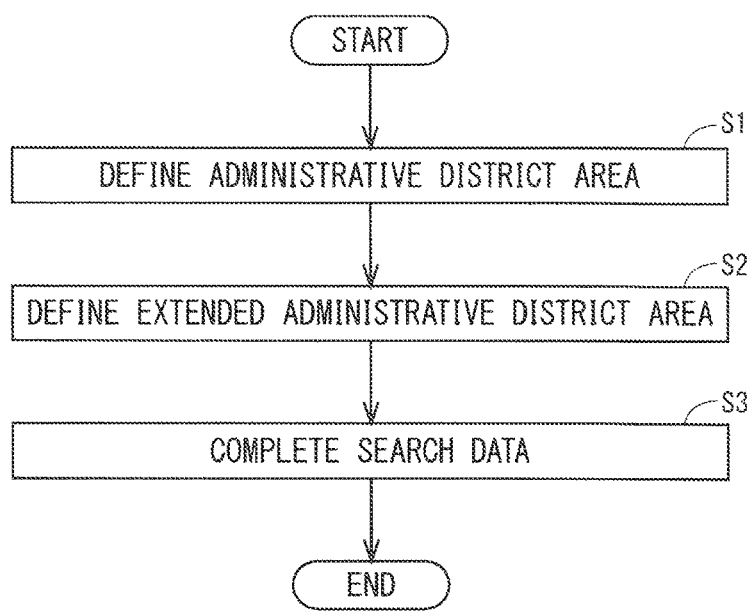
FIG. 3 is a flowchart showing an operation for generating search data in accordance with the first preferred embodiment.

FIG. 3 is a flowchart showing an operation for generating the search data 15b (for example, data shown in FIG. 7) stored in the data storage 15. This generation process is performed by, for example, a data generation device (not shown) that a vendor of map data, or the like, has.

In Step S1, first, the data generation device defines an administrative district area. In Step S2, the data generation device defines an extended administrative district area on the basis of the administrative district area. Then, in Step S3, the data generation device completes the search data 15b on the basis of the extended administrative district area, and the process shown in FIG. 3 is ended. The completed search data 15b is stored (memorized) in the data storage 15 of the navigation device 1 by, for example, a maker of the navigation device 1, or the like. Next, the administrative district area and the extended administrative district area will be described in detail.

<Administrative District Area>

Figure 4:
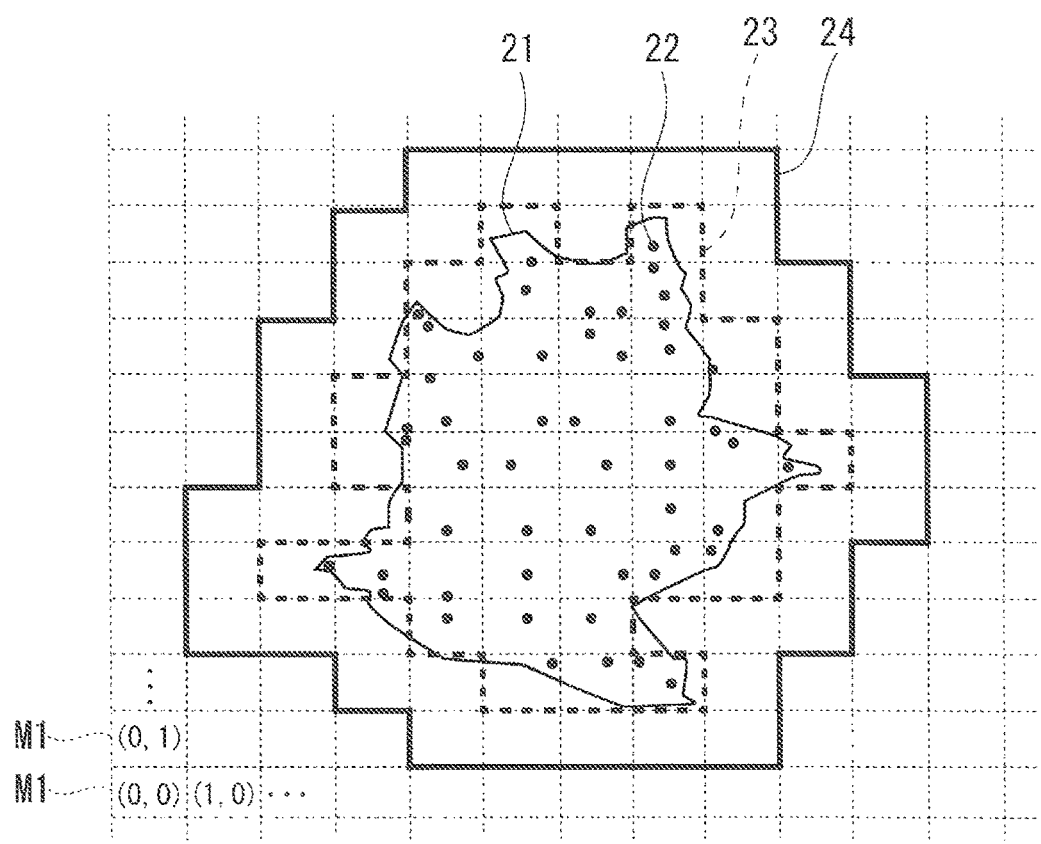
FIG. 4 is a view used for explaining an administrative district area and an extended administrative district area in accordance with the first preferred embodiment.

FIG. 4 is a view used for explaining the administrative district area and the extended administrative district area in accordance with the first preferred embodiment. FIG. 4 shows an actually-existing area 21 (hereinafter, referred to as a "real area 21") of one administrative district, a POI 22 within the one administrative district, an administrative district area 23 of the one administrative district represented by a thick broken line, and an extended administrative district area 24 of the one administrative district represented by a thick solid line. Specifically, in FIG. 4, the real area 21 of N1 city and the like are shown. Further, in FIG. 4, the above-described mesh areas M1 are represented as rectangles by thin broken lines.

In the exemplary case of FIG. 4, among the mesh areas M1 obtained by sectioning the area on the map, the data generation device collects some mesh areas M1 in each of which a POI 22 in N1 city is located, to thereby define the administrative district area 23 of N1 city. Similarly, the data generation device also defines respective administrative district areas 23 of not-shown other administrative districts. In Step S1 of FIG. 3, the administrative district area 23 is thereby defined.

Figure 5:
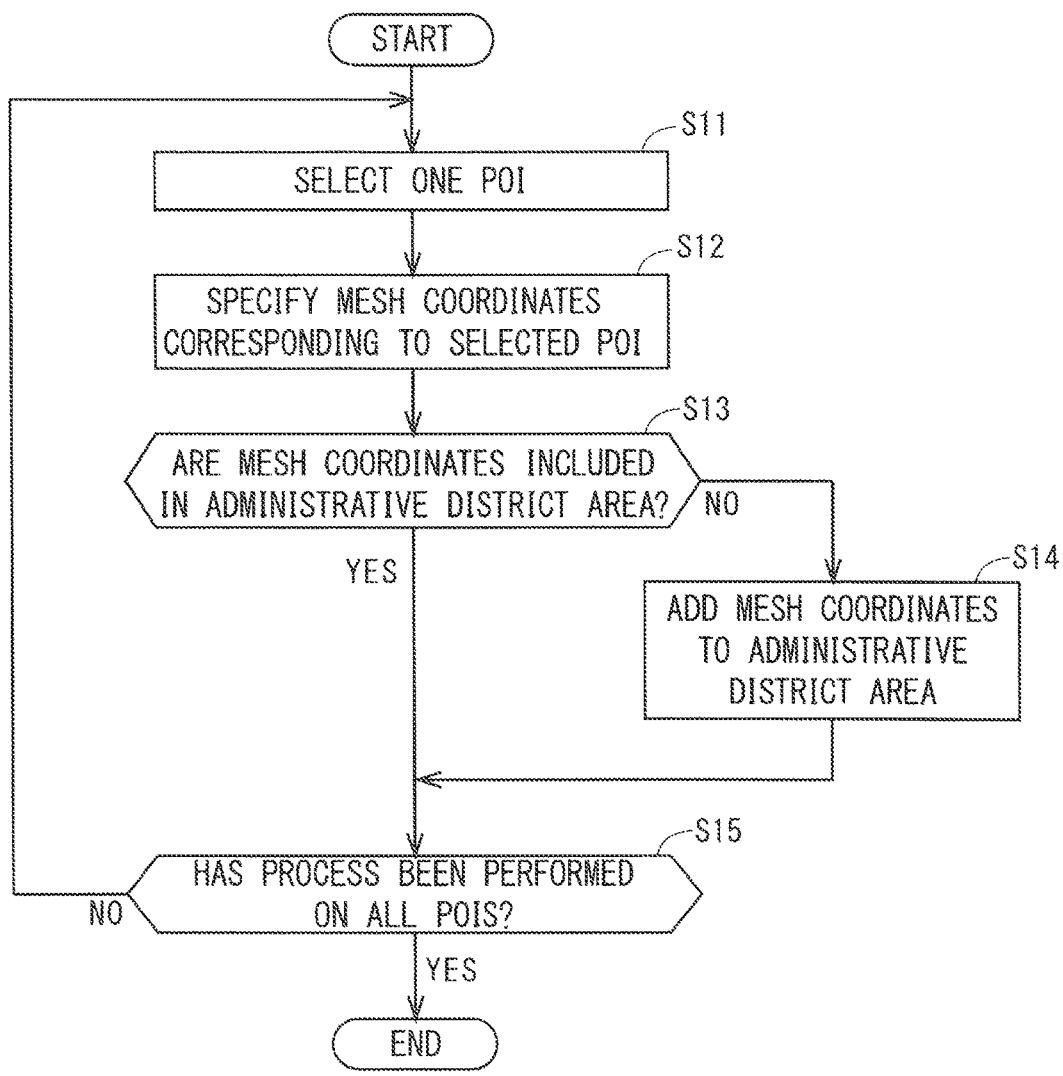
FIG. 5 is a flowchart showing an operation for defining the administrative district area in accordance with the first preferred embodiment.

FIG. 5 is a flowchart showing an operation for defining the administrative district area 23, which is performed by the data generation device. Though the following description will be made on a case where the data generation device defines the administrative district area 23 of N1 city, similarly, the respective administrative district areas 23 of other administrative districts are also defined.

In Step S11, first, the data generation device selects one of the POIs 22 in N1 city.

In Step S12, the data generation device specifies the mesh area M1 including the coordinates (x1, y1) of the selected POI 22 on the map, and specifies the mesh coordinates (X1, Y1) of the mesh area M1.

In Step S13, the data generation device determines whether or not the mesh coordinates (X1, Y1) which are specified in Step S12 are included in the administrative district area 23 of N1 city. When it is not determined that the mesh coordinates are included, the process goes to Step S14, and when it is determined that the mesh coordinates are included, the process goes to Step S15.

In Step S14, the data generation device adds the mesh coordinates (X1, Y1) which are specified in Step S12 to the administrative district area 23 of N1 city. After that, the process goes to Step S15.

In Step S15, the data generation device determines whether or not the above process has been performed on all the POIs 22 in N1 city. When it is determined that the process has been performed on all the POIs 22, the process shown in FIG. 5 is ended, and when it is not determined that the process has been performed on all the POIs 22, the process goes back to Step S11. Through such a process as above, one administrative district area 23 consisting of a group of mesh coordinates (X1, Y1) is defined.

<Extended Administrative District Area>

Next, the extended administrative district area 24 will be described. In the exemplary case of FIG. 4, the data generation device extends the above-described administrative district area 23 of N1 city, to thereby define the extended administrative district area 24 of N1 city. Similarly, the data generation device also defines respective extended administrative district areas 24 of not-shown other administrative districts. In Step S2 of FIG. 3, the extended administrative district area 24 is thereby defined.

Further, the extended administrative district area 24 shown in FIG. 4 is defined by adding the mesh areas M1 located outside the administrative district area 23 among the mesh areas M1 adjacent to the mesh areas M1 located at the periphery of the administrative district area 23 in a vertical direction, a horizontal direction, and oblique directions, to the administrative district area 23. Specifically, the extended administrative district area 24 is defined as an area consisting of the administrative district area 23 and a single line of the mesh areas M1 adjacent to the periphery of the administrative district area 23 and surrounding the administrative district area 23. The extended administrative district area 24, however, is not limited to this example but may be defined in such a manner as shown in, for example, the fourth preferred embodiment or the like.

<Search Data>

Figure 6:
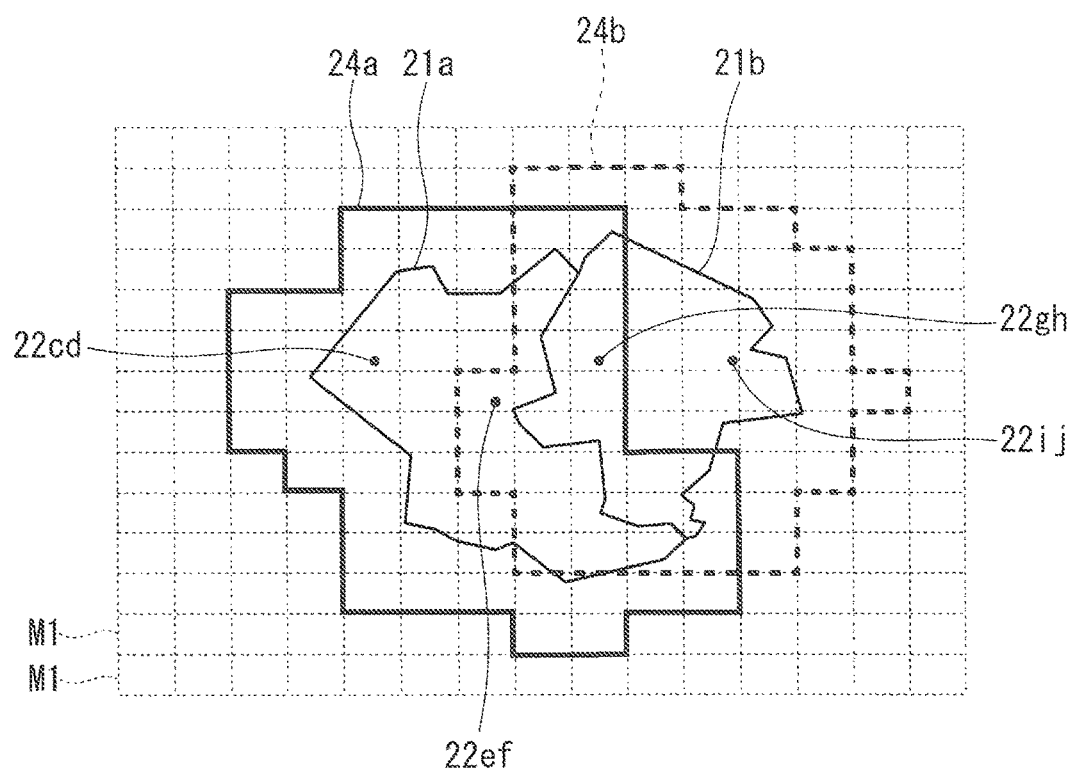
FIG. 6 is a view used for explaining the search data in accordance with the first preferred embodiment.

FIGS. 6 and 7 are views each used for explaining the search data 15b in accordance with the first preferred embodiment. FIG. 6 shows a real area 21a of A city represented by a thin solid line, a real area 21b of B city represented by another thin solid line, an extended administrative district area 24a of A city represented by a thick solid line, and an extended administrative district area 24b of B city represented by a thick broken line. For avoiding complicated illustration, however, areas with shapes slightly changed from the shapes of the respective extended administrative district areas of A city and B city to which the above specification is strictly applied are shown in FIG. 6 as the extended administrative district areas 24a and 24b. Further, FIG. 6 shows four exemplary POIs 22, i.e., a POI 22cd having a name of "cd", a POI 22ef having a name of "ef", a POI 22gh having a name of "gh", and a POI 22ij having a name of "ij".

FIG. 7 shows the search data 15b on A city and B city of FIG. 6. As shown in FIG. 7, the search data 15b includes a "name" indicating the name of the POI 22 in A city or B city, an "extended administrative district name" indicating which of the extended administrative district areas 24 of A city and B city the POI 22 belongs to, and a "real area name" indicating which of A city and B city the POI 22 actually belongs to.

Herein, in the exemplary case of FIG. 6, the data generation device associates the name of the administrative district (administrative district name) with the POI 22 within the administrative district and the POI 22 within the extended administrative district area 24 related to the administrative district, to thereby generate the search data 15b shown in FIG. 7.

In the extended administrative district area 24 of A city shown in FIG. 6, for example, included are the POIs 22cd, 22*ef*, and 22*gh*. Therefore, the data generation device associates each of "cd", "ef", and "gh" in the search data 15*b* of FIG. 7 with "A city" as the extended administrative district name. Similarly, in the extended administrative district area 24 of B city shown in FIG. 6, included are the POIs 22*ef*, 22*gh*, and 22*ij*. Therefore, the data generation device associates each of "ef", "gh", and "ij" in the search data 15*b* of FIG. 7 with "B city" as the extended administrative district name. The administrative district name is thereby associated with the POIs 22 within the extended administrative district area 24 related to the administrative district.

Further, in the real area 21*a* shown in FIG. 6, for example, included are the POIs 22*cd* and 22*ef*. Therefore, the data generation device associates each of "cd" and "ef" in the search data 15*b* of FIG. 7 with "A city" as the real area name. Similarly, in the real area 21*b* shown in FIG. 6, included are the POIs 22*gh* and 22*ij*. Therefore, the data generation device associates each of "gh" and "ij" in the search data 15*b* of FIG. 7 with "B city" as the real area name. The administrative district name is thereby associated with the POIs 22 within the administrative district The data generation device also performs the above association on other administrative districts which are not shown. In Step S3 of FIG. 3, the search data 15*b* is thereby completed.

<Operation of Navigation Device for Searching for POI>

Next, an operation for POI search, which is performed by the navigation device 1 shown in FIG. 1, will be described. It is assumed that the search data 15*b* shown in FIG. 7 is stored in the data storage 15. As to the POI search, an extended administrative district name search mode and a real area name search mode are defined in the controller 16 in accordance with the first preferred embodiment.

In a case where the extended administrative district name search mode is performed, when the administrative district name is received as the instruction information (input information), the controller 16 performs a search for the POI 22 within the extended administrative district area 24 corresponding to the received administrative district name on the basis of the administrative district name and the search data 15*b*. Then, the controller 16 displays the POI 22 which is found by the search on the output unit 14.

While the extended administrative district name search mode is performed, when the name of the administrative district of A city is received as the instruction information, for example, the controller 16 performs an exhaustive search for the POI 22 associated with the extended administrative district name of A city in the search data 15*b* of FIG. 7. Then, the controller 16 displays "cd", "ef", and "gh" which are found by the search on the output unit 14 as shown in FIG. 8. In this display, as to the POI 22 having the name of "gh" which is actually located in B city, "B city" is additionally written, being parenthesized, after the name of the POI 22.

Similarly, while the extended administrative district name search mode is performed, when the name of the administrative district of B city is received as the instruction information, the controller 16 performs an exhaustive search for the POI 22 associated with the extended administrative district name of B city in the search data 15*b* of FIG. 7. Then, the controller 16 displays "ef", "gh", and "ij" which are found by the search on the output unit 14, as shown in FIG. 9. In this display, as to the POI 22 having the name of "ef" which is actually located in A city, "A city" is additionally written, being parenthesized, after the name of the POI 22.

On the other hand, in a case where the extended administrative district name search mode is not performed and the real area name search mode is performed, when the administrative district name is received as the instruction information (input information), the controller 16 performs a search for the POI 22 within the administrative district corresponding to the received administrative district name on the basis of the administrative district name and the search data 15*b*. Then, the controller 16 displays the POI 22 which is found by the search on the output unit 14.

While the real area name search mode is performed, when the name of the administrative district of A city is received as the instruction information, for example, the controller 16 performs an exhaustive search for the POI 22 associated with the real area name of A city in the search data 15*b* of FIG. 7. Then, the controller 16 displays "cd" and "ef" which are found by the search on the output unit 14 as shown in FIG. 10.

Similarly, while the real area name search mode is performed, when the name of the administrative district of B city is received as the instruction information, the controller 16 performs an exhaustive search for the POI 22 associated with the real area name of B city in the search data 15*b* of FIG. 7. Then, the controller 16 displays "gh" and "ij" which are found by the search on the output unit 14, as shown in FIG. 11.

<Effects>

According to the first preferred embodiment described above, in the data storage 15, stored is the search data 15*b* in which the name of the administrative district is associated with the POI 22 within the extended administrative district area 24 related to the administrative district. In an address search as to the POI 22 which is actually located in "A city" and having a proper noun including "B city" adjacent to "A city", for example, it thereby becomes possible to find the POI 22 even when the user makes an input of "B city", not "A city", based on misidentification. Moreover, even when the navigation device 1 cannot have any polygon data indicating the real area 21 shown in FIG. 4 or the like for some reason, it is possible to perform the above-described search (desired search) by having the search data 15*b*.

Further, according to the first preferred embodiment, in the search data 15*b*, the name of the administrative district is associated not only with the POI 22 within the extended administrative district area 24 related to the administrative district but also with the POI 22 within the administrative district. It is thereby possible to selectively perform the search based on the extended administrative district name (corresponding to FIGS. 8 and 9) or the search based on the real area name (corresponding to FIGS. 10 and 11). Further, these two types of searches, i.e., the extended administrative district name search mode and the real area name search mode may be selectively performed with the input of the user or may be selectively performed in accordance with the priority which is set in advance by the user or a designer of the device. Furthermore, when the POIs 22 within the extended administrative district area 24 are displayed as shown in FIGS. 8 and 9, the POIs 22 belonging to the real administrative district and the POIs 22 not belonging to the real administrative district may be rearranged in accordance with the priority which is set in advance by the user or the designer of the device. Moreover, when it is not necessary to perform a search based on the real area name, the real area name of FIG. 7 may not be included in the search data 15*b*, and in other words, the POIs 22 within the administrative district may not be included in the search data 15*b*.

Variations of the First Preferred Embodiment

The data storage 15 of the first preferred embodiment stores therein the map data 15*a* and the search data 15*b*, as shown in FIG. 1. This, however, is only one exemplary case, and the data storage 15 may store therein the administrative district area 23 (for example, a group of mesh coordinates for each administrative district).

Even when the navigation device 1 cannot have any polygon data indicating the real area 21 shown in FIG. 4 or the like for some reason, the navigation device 1, with such a constitution, can perform the same information processing as a device having the polygon data does, by having the administrative district area 23. Further, since the administrative district area 23 is defined by the mesh areas M1 which are relatively easy to handle in an information processing, it is possible to reduce a processing load of the information processing as compared to the case where the polygon data indicating the real area 21 is used.

Further, in the first preferred embodiment, the case has been described where the data generation device defines the extended administrative district area 24 on the basis of the administrative district area 23. This, however, is only one exemplary case, and when the administrative district area 23 is stored in the data storage 15, the controller 16 may define the extended administrative district area 24 on the basis of the administrative district area 23.

Furthermore, the data storage 15 may store therein the extended administrative district area 24. Then, the controller 16 may complete the search data 15b on the basis of the extended administrative district area 24.

The Second Preferred Embodiment

In the first preferred embodiment, the POI 22 is applied to the specific feature of the present invention. On the other hand, in the second preferred embodiment of the present invention, a road is applied to the specific feature. Further, since the constitution of the navigation device 1 of the second preferred embodiment represented by a block diagram is the same as that of the first preferred embodiment, the constitution will not be shown. Then, in the navigation device 1 of the second preferred embodiment, constituent elements thereof which are identical or similar to those described in the first preferred embodiment are represented by the same reference signs, and the following description will be made, centering on the difference between the first and second preferred embodiments.

Figure 12:
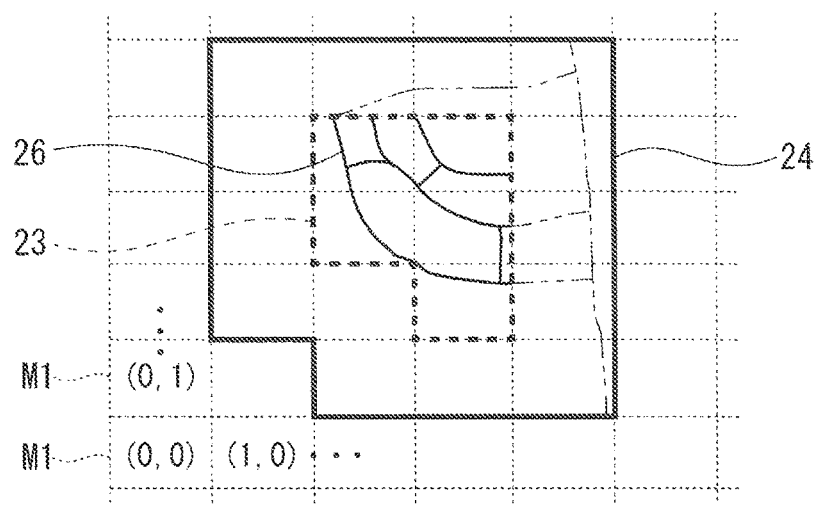
FIG. 12 is a view used for explaining an administrative district area and an extended administrative district area in accordance with a second preferred embodiment.

FIG. 12 is a view used for explaining an administrative district area 23 and an extended administrative district area 24 in accordance with the second preferred embodiment. FIG. 12 shows roads 26 in N2 city (one administrative district) (two-dot chain lines in FIG. 12 represent the roads 26 outside N2 city), an administrative district area 23 of N2 city, and an extended administrative district area 24 of N2 city. Further, in FIG. 12, the mesh areas M1 are represented as rectangles by thin broken lines.

In the exemplary case of FIG. 12, among the mesh areas M1 obtained by sectioning the area on the map, a data generation device of the second preferred embodiment collects some mesh areas M1 in which the road 26 in N2 city is located, to thereby define the administrative district area 23 of N2 city. Similarly, the data generation device also defines respective administrative district areas 23 of not-shown other administrative districts.

Specifically, in the above-described first preferred embodiment, among the mesh areas M1 obtained by sectioning the area on the map, some mesh areas M1 in each of which the POI 22 is located are collected for each administrative district, to thereby define the administrative district area 23. On the other hand, in the second preferred embodiment, among the mesh areas M1 obtained by sectioning the area on the map, some mesh areas M1 in each of which the road 26 is located are collected for each administrative district, to thereby define the administrative district area 23.

Figure 13:
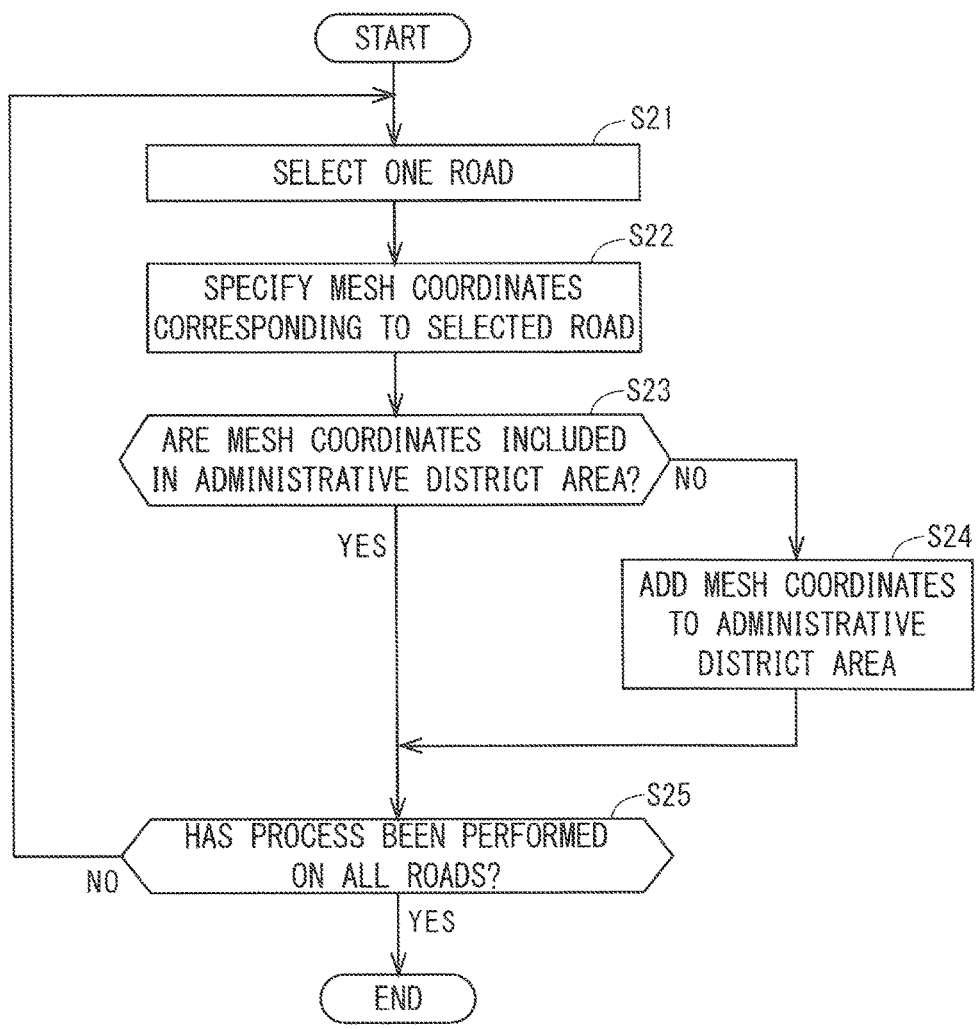
FIG. 13 is a flowchart showing an operation for defining the administrative district area in accordance with the second preferred embodiment.

FIG. 13 is a flowchart showing an operation for defining the administrative district area 23, which is performed by the data generation device. Though the following description will be made on a case where the data generation device defines the administrative district area 23 of N2 city, similarly, the respective administrative district areas 23 of other administrative districts are also defined.

In Step S21, first, the data generation device selects one of the roads 26 in N2 city.

In Step S22, the data generation device specifies the mesh area M1 including the coordinates (x2, y2) of the selected road 26 on the map, and specifies the mesh coordinates (X2, Y2) of the mesh area M1.

In Step S23, the data generation device determines whether or not the mesh coordinates (X2, Y2) which are specified in Step S22 are included in the administrative district area 23 of N2 city. When it is not determined that the mesh coordinates are included, the process goes to Step S24, and when it is determined that the mesh coordinates are included, the process goes to Step S25.

In Step S24, the data generation device adds the mesh coordinates (X2, Y2) which are specified in Step S22 to the administrative district area 23 of N2 city. After that, the process goes to Step S25.

In Step S25, the data generation device determines whether or not the above process has been performed on all the roads 26 in N2 city. When it is determined that the process has been performed on all the roads 26, the process shown in FIG. 13 is ended, and when it is not determined that the process has been performed on all the roads 26, the process goes back to Step S21. Through such a process as above, one administrative district area 23 consisting of a group of mesh coordinates (X2, Y2) is defined.

<Extended Administrative District Area>

Next, the extended administrative district area 24 will be described. In the exemplary case of FIG. 12, the data generation device extends the above-described administrative district area 23 of N2 city, to thereby define the extended administrative district area 24 of N2 city. Similarly, the data generation device also defines respective extended administrative district areas 24 of not-shown other administrative districts. In other words, also in the second preferred embodiment, like in the first preferred embodiment, the extended administrative district area 24 is defined by extending the administrative district area 23. Further, since the search data 15b in accordance with the second preferred embodiment is the same as that in the first preferred embodiment, the description thereof will be omitted.

<Effects>

According to the second preferred embodiment described above, the same effect as produced as to the POI 22 in the first preferred embodiment can be produced as to the road 26. Further, when the distribution of the POIs 22 in one administrative district is greatly different from that of the roads 26 in the one administrative district, the administrative district area 23 in the former case may be sometimes different from the administrative district area 23 in the latter case. For this reason, even in the same administrative district, since a different administrative district area 23 and further a different extended administrative district area 24 can be used in accordance with whether the specific feature is the POI 22 or the road 26, it can be expected to perform a search suitable for the type of specific feature.

The Third Preferred Embodiment

In the first preferred embodiment, the POI 22 is applied to the specific feature of the present invention. On the other hand, in the third preferred embodiment of the present invention, a terrain (background such as a river, a green space, or the like) is applied to the specific feature. Further, since the constitution of the navigation device 1 of the third preferred embodiment represented by a block diagram is the same as that of the first preferred embodiment, the constitution will not be shown. Then, in the navigation device 1 of the third preferred embodiment, constituent elements thereof which are identical or similar to those described in the first preferred embodiment are represented by the same reference signs, and the following description will be made, centering on the difference between the first and third preferred embodiments.

Figure 14:
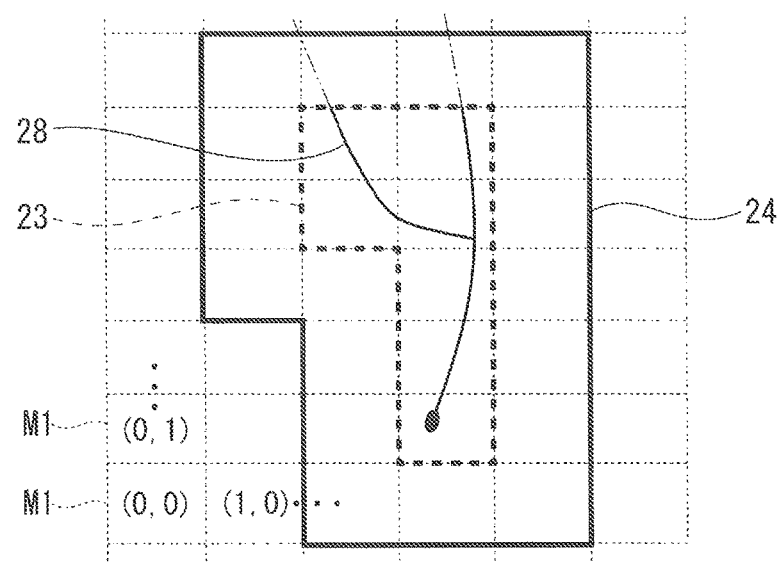
FIG. 14 is a view used for explaining an administrative district area and an extended administrative district area in accordance with a third preferred embodiment.

FIG. 14 is a view used for explaining an administrative district area 23 and an extended administrative district area 24 in accordance with the third preferred embodiment. FIG. 14 shows terrains 28 in N3 city (one administrative district) (two-dot chain lines in FIG. 14 represent the terrains 28 outside N3 city), an administrative district area 23 of N3 city, and an extended administrative district area 24 of N3 city. Further, in FIG. 14, the mesh areas M1 are represented as rectangles by thin broken lines.

In the exemplary case of FIG. 14, among the mesh areas M1 obtained by sectioning the area on the map, a data generation device of the third preferred embodiment collects some mesh areas M1 in which the terrain 28 in N3 city is located, to thereby define the administrative district area 23 of N3 city. Similarly, the data generation device also defines respective administrative district areas 23 of not-shown other administrative districts.

Specifically, in the above-described first preferred embodiment, among the mesh areas M1 obtained by sectioning the area on the map, some mesh areas M1 in each of which the POI 22 is located are collected for each administrative district, to thereby define the administrative district area 23. On the other hand, in the third preferred embodiment, among the mesh areas M1 obtained by sectioning the area on the map, some mesh areas M1 in each of which the terrain 28 is located are collected for each administrative district, to thereby define the administrative district area 23.

Figure 15:
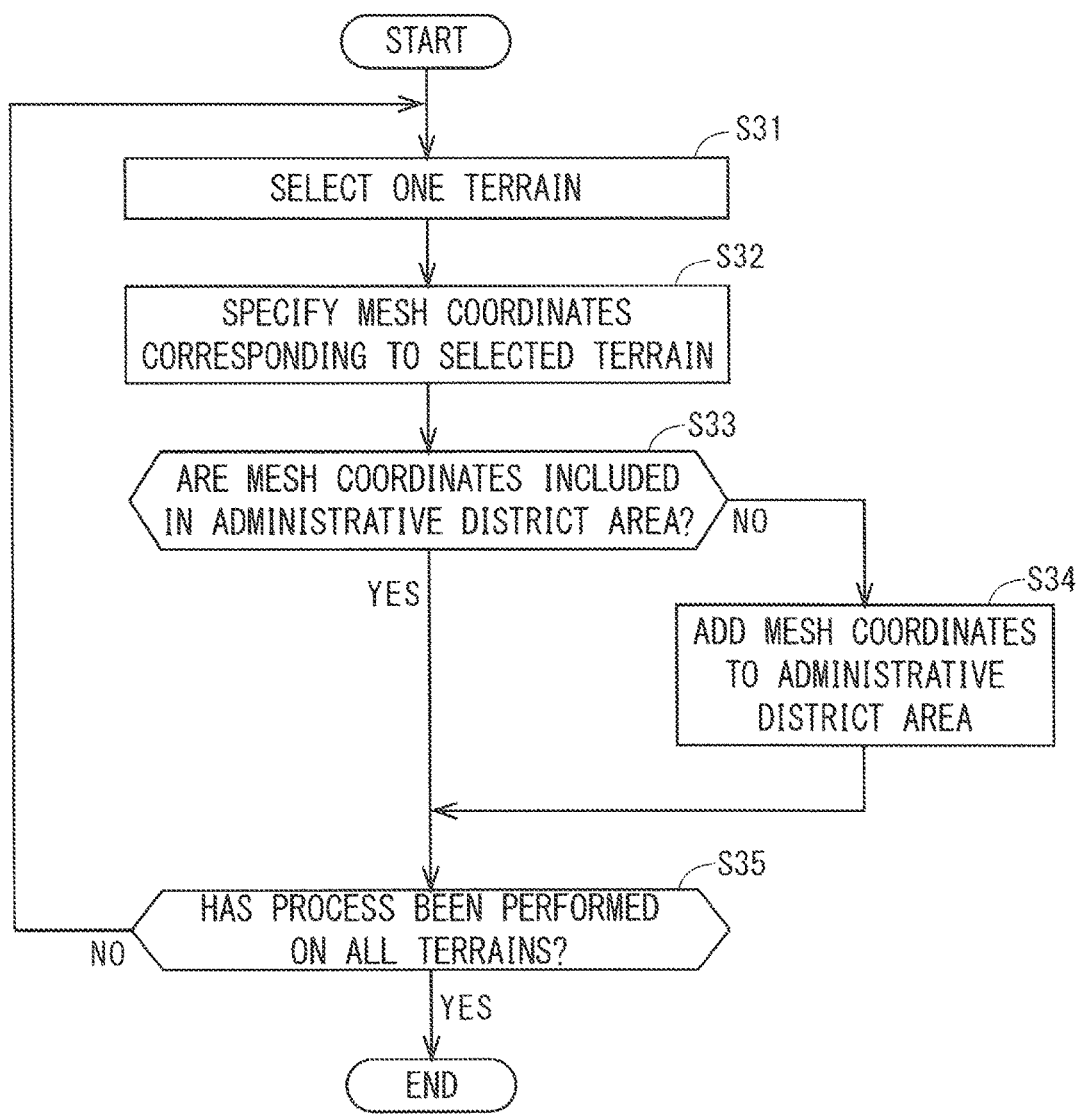
FIG. 15 is a flowchart showing an operation for defining the administrative district area in accordance with the third preferred embodiment.

FIG. 15 is a flowchart showing an operation for defining the administrative district area 23, which is performed by the data generation device. Though the following description will be made on a case where the data generation device defines the administrative district area 23 of N3 city, similarly, the respective administrative district areas 23 of other administrative districts are also defined.

In Step S31, first, the data generation device selects one of the terrains 28 in N3 city.

In Step S32, the data generation device specifies the mesh area M1 including the coordinates (x3, y3) of the selected terrain 28 on the map, and specifies the mesh coordinates (X3, Y3) of the mesh area M1.

In Step S33, the data generation device determines whether or not the mesh coordinates (X3, Y3) which are specified in Step S32 are included in the administrative district area 23 of N3 city. When it is not determined that the mesh coordinates are included, the process goes to Step S34, and when it is determined that the mesh coordinates are included, the process goes to Step S35.

In Step S34, the data generation device adds the mesh coordinates (X3, Y3) which are specified in Step S32 to the administrative district area 23 of N3 city. After that, the process goes to Step S35.

In Step S35, the data generation device determines whether or not the above process has been performed on all the terrains 28 in N3 city. When it is determined that the process has been performed on all the terrains 28, the process shown in FIG. 15 is ended, and when it is not determined that the process has been performed on all the terrains 28, the process goes back to Step S31. Through such a process as above, one administrative district area 23 consisting of a group of mesh coordinates (X3, Y3) is defined.

<Extended Administrative District Area>

Next, the extended administrative district area 24 will be described. In the exemplary case of FIG. 14, the data generation device extends the above-described administrative district area 23 of N3 city, to thereby define the extended administrative district area 24 of N3 city. Similarly, the data generation device also defines respective extended administrative district areas 24 of not-shown other administrative districts. In other words, also in the third preferred embodiment, like in the first preferred embodiment, the extended administrative district area 24 is defined by extending the administrative district area 23. Further, since the search data 15*b* in accordance with the third preferred embodiment is the same as that in the first preferred embodiment, the description thereof will be omitted.

<Effects>

According to the third preferred embodiment described above, the same effect as produced as to the POI 22 in the first preferred embodiment and the road 26 in the second preferred embodiment can be produced as to the terrain 28.

The Fourth Preferred Embodiment

Since the constitution of the navigation device 1 of the fourth preferred embodiment of the present invention represented by a block diagram is the same as that of the first preferred embodiment, the constitution will not be shown. Then, in the navigation device 1 of the fourth preferred embodiment, constituent elements thereof which are identical or similar to those described in the first preferred embodiment are represented by the same reference signs, and the following description will be made, centering on the difference between the first and fourth preferred embodiments.

Figure 16:
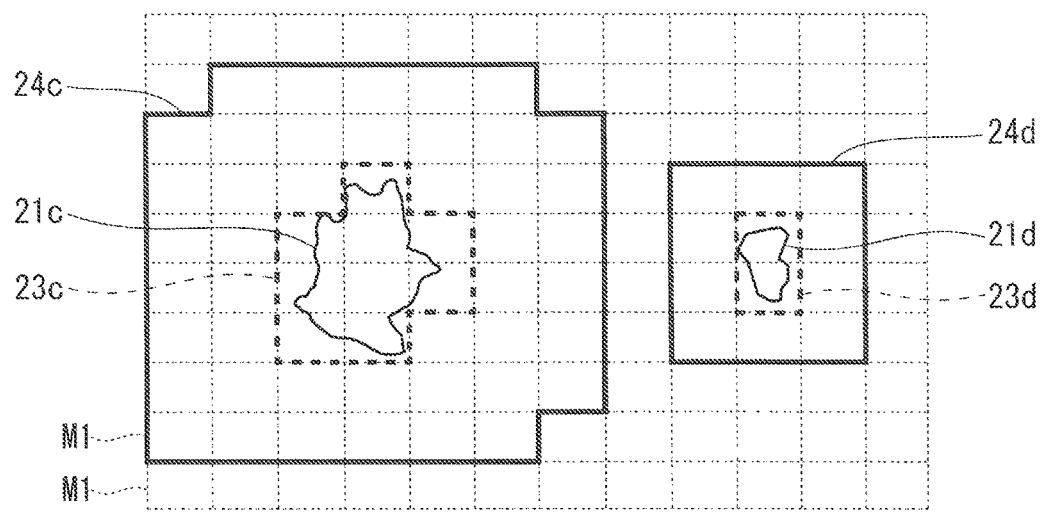
FIG. 16 is a view used for explaining an administrative district area and an extended administrative district area in accordance with a fourth preferred embodiment.

FIG. 16 is a view used for explaining an administrative district area and an extended administrative district area in accordance with the fourth preferred embodiment. FIG. 16 shows a real area 21*c*, an administrative district area 23*c*, and an extended administrative district area 24*c* of N4 city and a real area 21*d*, an administrative district area 23*d*, and an extended administrative district area 24*d* of N5 village. Both in N4 city and N5 village, the administrative district areas 23*c* and 23*d* are represented by thick broken lines and the extended administrative district areas 24*c* and 24*d* are represented by thick solid lines.

In the fourth preferred embodiment, the extended administrative district area is defined on the basis of the administrative district area and the type of administrative district related to the administrative district area. Specifically, the extended administrative district area is defined to consist of the administrative district area and n (n is an integer) mesh areas M1 corresponding to the type of administrative district related to the administrative district area.

With reference to FIG. 16, to the n mesh areas M1 corresponding to the type of administrative district of N4 city, i.e., "city", applied are double lines of mesh areas M1 adjacent to the periphery of the administrative district area 23c of N4 city and surrounding the administrative district area 23c. As a result, the extended administrative district area 24c of N4 city is defined to consist of the administrative district area 23c of N4 city and double lines of mesh areas M1 adjacent to the periphery of the administrative district area 23c and surrounding the administrative district area 23c.

On the other hand, to the n mesh areas M1 corresponding to the type of administrative district of N5 village, i.e., "village", applied is a single line of mesh areas M1 adjacent to the periphery of the administrative district area 23d of N5 village and surrounding the administrative district area 23d. As a result, the extended administrative district area 24d of N5 village is defined to consist of the administrative district area 23d of N5 village and a single line of mesh areas M1 adjacent to the periphery of the administrative district area 23d and surrounding the administrative district area 23d.

<Effects>

According to the fourth preferred embodiment described above, as the scale of the administrative district related to the administrative district area becomes larger, the number of mesh areas M1 to be added to the administrative district area in order to define the extended administrative district area can be increased. It is thereby possible to achieve the search data 15b adapted to the actual situation such as a situation in which the user more tends to make a wrong input of the name of the administrative district with respect to a specific feature (e.g., a POI 22, a road 26, or a terrain 28) around the administrative district as the scale of the administrative district becomes larger.

Further, the above description has been made, assuming that the number of mesh areas M1 to be added to the administrative district area in order to define the extended administrative district area, i.e., "n", is an integer. The number, however, is not limited to an integer but may be a decimal fraction such as 5.5, 10.5, or the like. In other words, the mesh areas which surround the administrative district area 23 in order to define the extended administrative district area 24 may be adopted in units of decimal fractions, such as 0.5 lines, 1.5 lines, . . . , not in units of integers, such as a single line, double lines, . . . , or the like. With such a structure, since the extended administrative district area can be defined in units of meshes which can be searched quickly, it can be expected to reduce the time required to generate the search data 15b.

Variations of the Fourth Preferred Embodiment

Though the extended administrative district area is defined on the basis of the administrative district area and the type of administrative district related to the administrative district area in the fourth preferred embodiment described above, the present invention is not limited to this case.

The extended administrative district area may be defined on the basis of, for example, the administrative district area and the number of mesh areas M1 related to the administrative district area. Specifically, the extended administrative district area may be defined to consist of the administrative district area and n (n is an integer or a decimal fraction) mesh areas M1 corresponding to the number of mesh areas M1 related to the administrative district area.

With reference to FIG. 16, the number of mesh areas M1 related to the administrative district area 23c of N4 city is not less than the number (herein, 9) determined in advance, and to n mesh areas M1 corresponding to the number not less than the number determined in advance, applied are double lines of mesh areas M1 adjacent to the periphery of the administrative district area 23c of N4 city and surrounding the administrative district area 23c. As a result, the extended administrative district area 24c of N4 city is defined to consist of the administrative district area 23c of N4 city and double lines of mesh areas M1 adjacent to the periphery of the administrative district area 23c and surrounding the administrative district area 23c.

On the other hand, the number of mesh areas M1 related to the administrative district area 23d of N5 village is less than the number (herein, 9) determined in advance, and to n mesh areas M1 corresponding to the number less than the number determined in advance, applied is a single line of mesh areas M1 adjacent to the periphery of the administrative district area 23d of N5 village and surrounding the administrative district area 23d. As a result, the extended administrative district area 24d of N5 village is defined to consist of the administrative district area 23d of N5 village and a single line of mesh areas M1 adjacent to the periphery of the administrative district area 23d and surrounding the administrative district area 23d.

With such a structure, as the area of the administrative district related to the administrative district area becomes larger, the number of mesh areas M1 to be added to the administrative district area in order to define the extended administrative district area can be increased. It is thereby possible to achieve the search data 15b adapted to the actual situation such as a situation in which the user more tends to make a wrong input of the name of the administrative district with respect to a specific feature (e.g., a POI 22, a road 26, or a terrain 28) around the administrative district as the area of the administrative district becomes larger.

Further, as another exemplary case, the extended administrative district area may be defined on the basis of the administrative district area and the number of specific features within the administrative district related to the administrative district area. Specifically, the extended administrative district area may be defined to consist of the administrative district area and n (n is an integer or a decimal fraction) mesh areas M1 corresponding to the number of specific features within the administrative district related to the administrative district area. Though the following description will be made assuming that the specific feature is a POI 22, the same applies to a case where the specific feature is a road 26 (FIG. 12) or a terrain 28 (FIG. 14).

Figure 17:
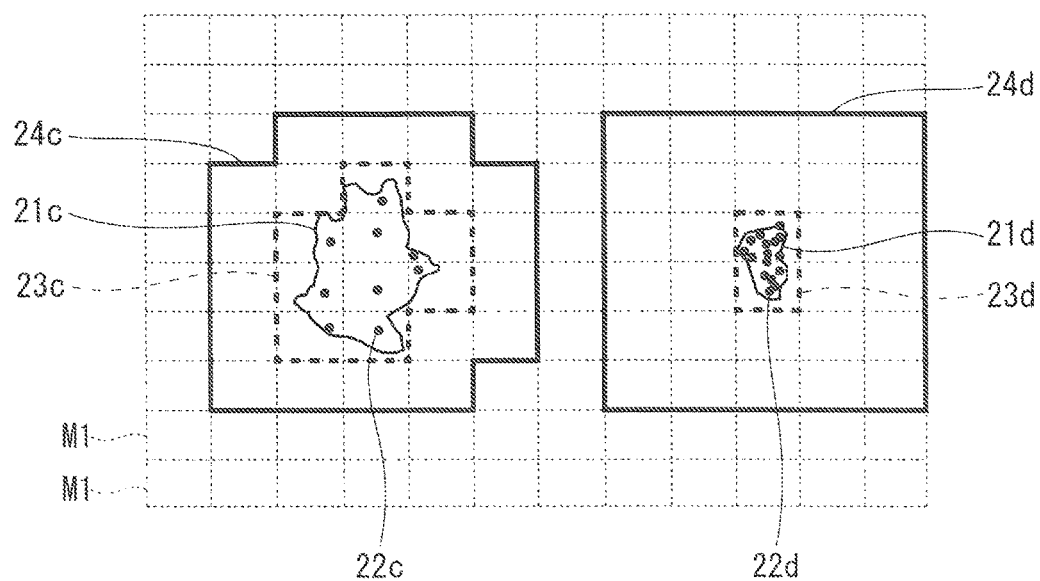
FIG. 17 is a view used for explaining an administrative district area and an extended administrative district area in accordance with a variation of the fourth preferred embodiment.

With reference to FIG. 17, the number of POIs 22 within the administrative district related to the administrative district area 23c of N4 city is less than the number (herein, 10) determined in advance, and to n mesh areas M1 corresponding to the number less than the number determined in advance, applied is a single line of mesh areas M1 adjacent to the periphery of the administrative district area 23c of N4 city and surrounding the administrative district area 23c. As a result, the extended administrative district area 24c of N4 city is defined to consist of the administrative district area 23c of N4 city and a single line of mesh areas M1 adjacent to the periphery of the administrative district area 23c and surrounding the administrative district area 23c.

On the other hand, the number of POIs 22 within the administrative district related to the administrative district area 23d of N5 village is not less than the number (herein, 10) determined in advance, and to n mesh areas M1 corresponding to the number not less than the number determined in advance, applied are double lines of mesh areas M1 adjacent to the periphery of the administrative district area 23d of N5 village and surrounding the administrative district area 23d. As a result, the extended administrative district area 24d of N5 village is defined to consist of the administrative district area 23d of N5 village and double lines of mesh areas M1 adjacent to the periphery of the administrative district area 23d and surrounding the administrative district area 23d.

With such a structure, as the number of specific features related to the administrative district area becomes larger, the number of mesh areas M1 to be added to the administrative district area in order to define the extended administrative district area can be increased. It is thereby possible to achieve the search data 15b adapted to the actual situation such as a situation in which the user more tends to make a wrong input of the name of the administrative district with respect to a specific feature around the administrative district as the number of specific features within the administrative district becomes larger.

<Variations in which Map Information Processing Apparatus is Applied to Devices Other than Navigation Device>

The map information processing apparatus described above can be applied not only to the navigation device 1 mounted on a vehicle but also to a map information processing apparatus configured as a system by appropriately combining a PND (Portable Navigation Device), a portable terminal (for example, a cellular phone, a smartphone, a tablet, or the like), which are mountable on a vehicle, a server, and the like. In this case, the functions or the constituent elements of the navigation device 1 described above are dispersed separately into the devices constituting the system.

Though the configuration in which the map information processing apparatus is applied to the navigation device 1 has been described above, for example, the present invention is not limited to this configuration, but the map information processing apparatus may be applied to any one of the PND, the portable terminal, and the server.

Further, though the configuration in which the data storage 15 of the navigation device 1 is applied to the storage medium of the present invention has been described above, the present invention is not limited to this configuration. For example, a storage equivalent to the data storage 15 among the constituent elements of the smartphone or a storage equivalent to the data storage 15 among the constituent elements of the server may be applied. Furthermore, though the configuration in which the controller 16 of the navigation device 1 is applied to the controller of the present invention has been described above, the present invention is not limited to this configuration. For example, a controller equivalent to the controller 16 among the constituent elements of the smartphone or a controller equivalent to the controller 16 among the constituent elements of the server may be applied.

In the present invention, the preferred embodiments may be freely combined, or may be changed or omitted as appropriate, without departing from the scope of the invention.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS 1 navigation device, 15 data storage, 15b search data, 16 controller, 22 POI, 23 administrative district area, 24 extended administrative district area, 26 road, 28 terrain, M1 mesh area

The invention claimed is:

1. A non-transitory storage medium comprising a memory which stores therein search data that a map information processing apparatus uses to search for features on a map,
wherein each of a plurality of administrative district areas is defined in said search data by mesh areas, which correspond to a respective one of a plurality of administrative districts represented on said map, among mesh areas obtained by sectioning an area on said map,
said search data further defines a plurality of extended administrative district areas for said plurality of administrative district areas, respectively, each of said extended administrative district areas being defined as an aggregation of said mesh areas of a corresponding one of said administrative district areas and a predetermined number of said mesh areas which form a closed shape surrounding the periphery of said administrative district area, wherein said predetermined number is defined on the basis of the type of administrative district related to said administrative district area, and
said search data includes data, for each of said features, identifying one of said extended administrative district areas which is associated with said feature and one of administrative districts in which said feature is located.

2. The non-transitory storage medium according to claim 1, wherein
each of said administrative district areas is defined by said mesh areas in each of which at least one of said features existing in the corresponding administrative district is located.

3. The non-transitory storage medium according to claim 1, wherein
each of said features includes a POI (point of interest), a road, or a terrain.

4. A map information processing apparatus, comprising:
a non-transitory storage medium as defined in claim 1;
a receiver that receives a name of an administrative district as input information;
a controller that makes a search for each of said features within the one of said extended administrative district areas defined by extending the administrative district area corresponding to said administrative district whose name is received as said input information and said search data stored in said storage medium; and
a display that displays each of said features which are found by search of said controller.

5. The map information processing apparatus according to claim 4, wherein
said administrative district area is defined by said mesh areas in each of which a predetermined feature existing in said administrative district whose name is received as said input information is located.

6. The map information processing apparatus according to claim 4, wherein
for each of said administrative district areas, said predetermined number is n (n is an integer or a decimal fraction) defined on the basis of any one of the type of said administrative district related to said administrative district area, the number of said mesh areas related to said administrative district area, and the number of said features which are predetermined within said administrative district related to said administrative district area.

7. The map information processing apparatus according to claim 4, wherein said controller is capable of selecting whether to make a search for said features within said administrative district whose name is received as said input information or for said features within the one of said extended administrative district areas corresponding to said administrative district whose name is received as said input information.

8. The map information processing apparatus according to claim 4, wherein when said name of said administrative district which is received as said input information is different from a name of an administrative district in which one of said features to be displayed is located, said display further displays said name of said administrative district in which one of said features to be displayed is located.

9. A data generation method by which a data generation device generates search data that a map information processing apparatus uses to search for features on a map, comprising the steps of:

defining each of a plurality of administrative district areas in said search data by mesh areas, which correspond to a respective one of a plurality of administrative districts represented on said map, among mesh areas obtained by sectioning an area on said map;

defining in said search data a plurality of extended administrative district areas for said plurality of administrative district areas, respectively, each of said extended administrative district areas being defined as an aggregation of said mesh areas of a corresponding one of said administrative district areas and a predetermined number of said mesh areas which form a closed shape surrounding the periphery of said administrative district area, wherein said predetermined number is defined on the basis of the type of administrative district related to said administrative district area; and generating data in said search data, for each of said features, identifying one of said extended administrative district areas which is associated with said feature and one of administrative districts in which said feature is located.

10. The data generation method according to claim 9, wherein said administrative district area is defined by said mesh areas in each of which a predetermined feature existing in said administrative district is located.

* * * * *